US008804747B2

(12) United States Patent
Galles et al.

(10) Patent No.: US 8,804,747 B2
(45) Date of Patent: Aug. 12, 2014

(54) NETWORK INTERFACE CONTROLLER FOR VIRTUAL AND DISTRIBUTED SERVICES

(75) Inventors: Michael B. Galles, Los Altos, CA (US); Elango Ganesan, Palo Alto, CA (US); Michael Freed, Pleasanton, CA (US); Lawrence R. Kreeger, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 12/888,838

(22) Filed: Sep. 23, 2010

(65) Prior Publication Data

US 2012/0079478 A1  Mar. 29, 2012

(51) Int. Cl.
*H04L 12/28* (2006.01)
*G06F 9/455* (2006.01)

(52) U.S. Cl.
USPC .................. 370/399; 370/462; 370/463

(58) Field of Classification Search
None
See application file for complete search history.

(56) References Cited

U.S. PATENT DOCUMENTS

| 2007/0230435 | A1* | 10/2007 | Anzai .................... 370/351 |
| 2008/0019360 | A1* | 1/2008 | Belgaied et al. ........... 370/389 |
| 2008/0267177 | A1 | 10/2008 | Johnson et al. |
| 2008/0271134 | A1 | 10/2008 | Johnson et al. |
| 2009/0059808 | A1* | 3/2009 | Pepper et al. ............. 370/252 |
| 2009/0083445 | A1* | 3/2009 | Ganga .................... 709/250 |
| 2009/0089351 | A1 | 4/2009 | Belgaied et al. |
| 2009/0328219 | A1* | 12/2009 | Narayanaswamy ........... 726/23 |
| 2010/0043067 | A1* | 2/2010 | Varadhan et al. ............. 726/13 |
| 2010/0071024 | A1* | 3/2010 | Eyada .................... 726/1 |
| 2011/0116362 | A1* | 5/2011 | Singatwaria ............... 370/216 |
| 2011/0142053 | A1* | 6/2011 | Van Der Merwe et al. ................... 370/395.1 |

OTHER PUBLICATIONS

PCT International Search Report and Written Opinion, PCT/US2011/031224, Jul. 12, 2011, 9 pages.

* cited by examiner

*Primary Examiner* — Chi Pham
*Assistant Examiner* — Soon-Dong D Hyun
(74) *Attorney, Agent, or Firm* — Edell, Shapiro & Finnan, LLC

(57) ABSTRACT

In one embodiment a method and apparatus that support virtual services including virtual network interface control functionality for virtual machines running on a server. A method includes receiving a packet at a network interface card from a data communication network, classifying, within the network interface card, the packet to select one of multiple flow tables to which the packet should be assigned to obtain a selected flow table, the classifying being based, at least, on a logical interface with which the packet is associated, processing the packet based on information stored in the selected flow table, and passing the packet to a virtual machine operating on a computer to which the network interface card is communicatively connected, the virtual machine being associated with the logical interface.

20 Claims, 5 Drawing Sheets

NETWORK INTERFACE CONTROLLER FOR VIRTUAL AND DISTRIBUTED SERVICES

TECHNICAL FIELD

The present disclosure relates to electronic data services, particularly data center services that support virtualization.

BACKGROUND

Computer networks in a data center rely increasingly on sophisticated services to enable scalability, virtualization, and security. These services range from load balancing to firewalls to fine grain network metrics. As cloud computing and other large scale virtual server deployments grow, providing these network services in a scalable and manageable fashion is increasingly difficult.

Ideally, each individual network flow in a large scale server deployment is tracked in order to provide appropriate services, e.g., quality of service, policies, etc. to an identified connection or flow. In some cases, data center switches may provide some of these services, but the number of individual flows passing through a single switch requires excessive switch resources to track and manage each flow.

DESCRIPTION OF EXAMPLE EMBODIMENTS

Overview

Described herein are embodiments of a method and apparatus that support virtual services including virtual network interface control functionality for virtual machines running on a server. A method includes receiving a packet at a network interface card from a data communication network, classifying, within the network interface card, the packet to select one of multiple flow tables to which the packet should be assigned to obtain a selected flow table, the classifying being based, at least, on a logical interface with which the packet is associated, processing the packet based on information stored in the selected flow table, and passing the packet to a virtual machine operating on a computer to which the network interface card is communicatively connected, the virtual machine being associated with the logical interface.

The method also includes receiving, from the computer to which the network interface card is communicatively connected, at the network interface card, a second packet, and forwarding the second packet for classifying within the network interface card.

Example Embodiments

Figure 1:
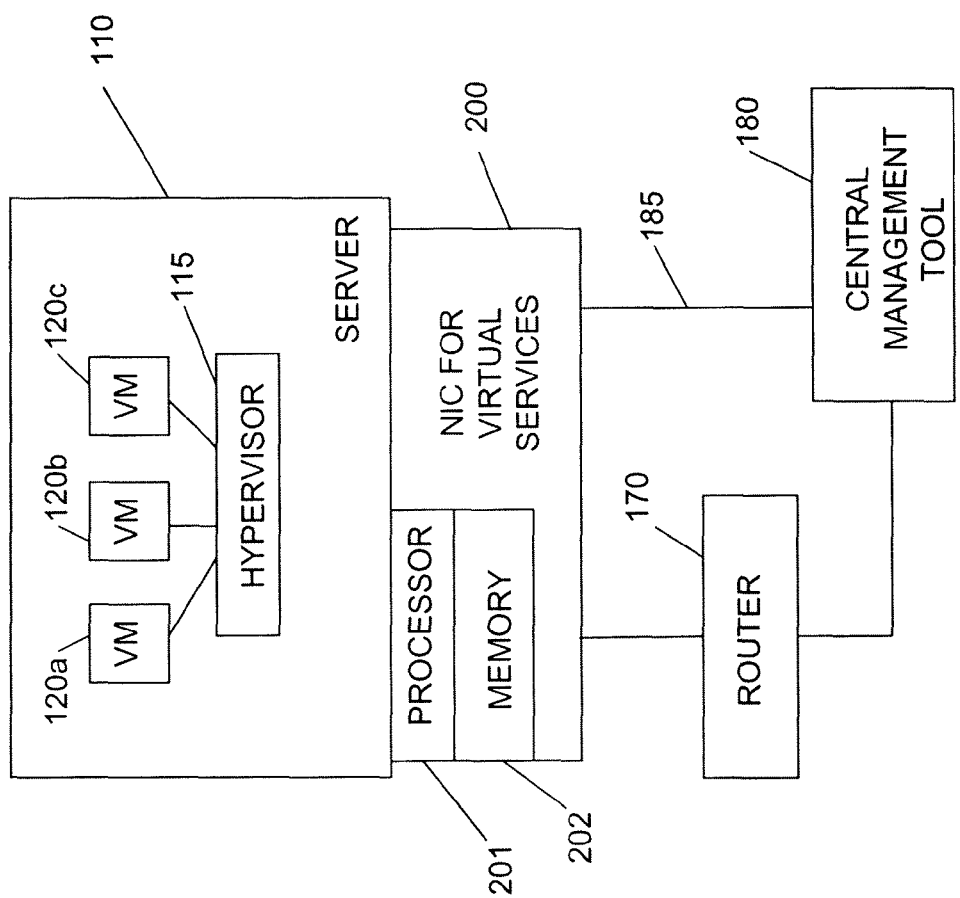
FIG. 1 shows a network interface card or controller that serves multiple virtual machines operating on a single server.

FIG. 1 shows a server 110 that supports multiple virtual machines (VMs) 120a, 120b, 120c that are supported by a hypervisor 115. Server 110 may be a stand alone server or may be part of a complex of servers in a data center infrastructure. A network interface card (or controller) (NIC) 200 is communicatively coupled to server 110. As will be explained in more detail below, NIC 200 supports virtual services, i.e., network interface control services that support respective ones of the virtual machines 120a, 120b, 120c running on server 110. Thus, NIC 200, from the perspective of the each of the virtual machines 120a, 120b, 120c, acts as a dedicated network interface controller.

NIC 200 includes a processor 201 and memory 202, the function of which will also be described more fully below. NIC 200 is connected to a computer network via, e.g., router 170. A central management tool 180 may be used to manage NIC 200. As shown, communication between NIC 200 and the central management tool 180 may be via router 170 (or other network element) or may be via a more proprietary and/or direct link 185.

The functionality of NIC 200 may be implemented as one or more hardware components, one or more software components, or combinations thereof. More specifically, processor 201 may be a programmable processor (microprocessor or microcontroller) or a fixed-logic processor. In the case of a programmable processor, any associated memory 202 may be of any type of tangible processor readable memory (e.g., random access, read-only, etc.) that is encoded with or stores instructions to effect the functionality of NIC 200. In the case of a fixed-logic processing device, the logic or instructions may be encoded in, e.g., an application specific integrated circuit (ASIC) or digital signal processor that is configured with firmware comprised of instructions or logic that cause the processor 201 to perform the functions described herein. Thus, NIC 200 may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor (or computer) readable medium that is encoded with instructions for execution by a processor that, when executed by the processor, are operable to cause the processor to perform the functions described herein.

Figure 2:
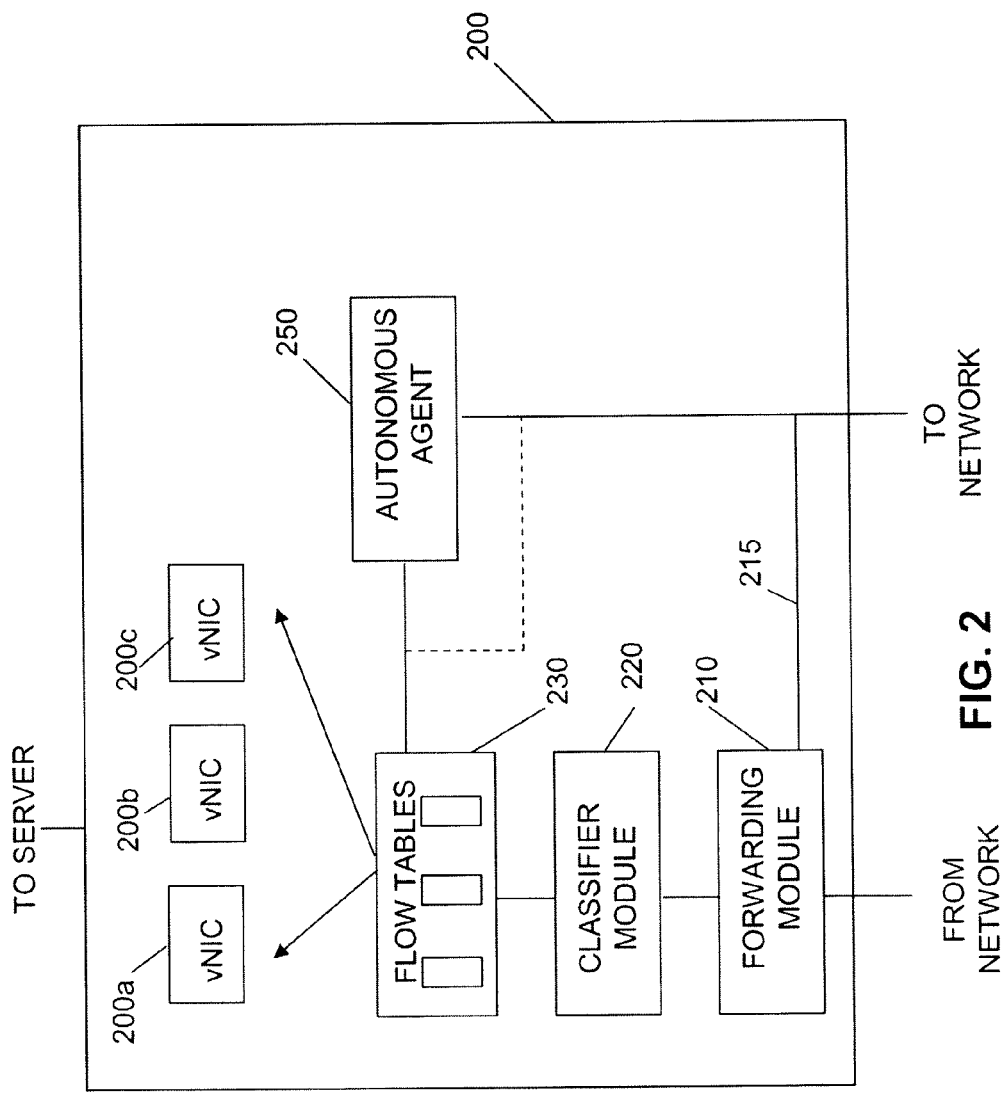
FIGS. 2 and 3 show, respectively, example embodiments of a network interface card that support ingress and egress of packet flows for multiple virtual network interface controllers.

FIG. 2 shows an embodiment of NIC 200 that supports ingress of packet flows for multiple virtual network interface controllers 200a, 200b, 200c that support virtual machines running on server 110. At a high level, NIC 200 integrates a flow tracking mechanism, packet forwarding control, packet rewrite capability, and an autonomous management agent into a device that is located at the server edge. This allows individual flow-based steering and/or services to be pushed to the computer (server) edge of a data center network. Packets that arrive at NIC 200 are received at forwarding module 210 and are then passed to classifier module 220. The packets are then compared with an internal flow table 230, resulting in, e.g., a miss, hit, or collision.

The forwarding module 210 performs logical interface (LIF) identification by, e.g., inspecting packets and any encapsulation of those packets, and may also perform replication (e.g. for multicasting) of packets incoming either from the network or from a loopback path 215 which may come directly from flow tables 230 or from the autonomous agent 250. The forwarding module 210 inspects the header of each incoming packet and associates each packet to a logical interface, typically by looking up the packet's destination address in a local forwarding table.

The classifier module 220 receives the LIF identification and identifies a packet type based on that information and using appropriate data in memory. Packet types may include, for example, those consistent with an IPv4 or IPv6 layer associated with TCP or UDP protocol, or an FTP or other well known protocol. Once the packet type is known, classifier module 220 is configured to assign a selected flow table to process the packet. In other words, classifier module 220 determines what flow type the incoming packet belongs to and assigns an appropriate flow table 230a, 230b, 230c, etc. to process that packet in accordance with the policies associated with that flow type. Flow tables may be categorized into, for instance, four types: Transmission Control Protocol (TCP) flows, User Datagram Protocol (UDP) flows, Internet Protocol (IP) (but not TCP or UDP) flows, and non IP flows. Once the classifier module 220 has identified the flow type, the flow table mechanism searches for that specific flow in the table. The specific flow may be identified, for example, by TCP source and destination ports as well as the source and destination IP address. The exact flow may already be present in the table, which is defined as a table hit, or it may not be present in the table, which is defined as a miss or collision. A miss occurs when the flow is not present in the table and there is an available location in the table to store the flow, a collision occurs when the flow is not present in the table and there is no available location to store the flow.

As indicated above, a look up in a flow table will result in a miss, hit, or collision. A miss may result in, e.g., an automatic flow table insert and action, such as new flow registration with a service. For example, when a firewall service is enabled for a LIF and the first packet of a new flow arrives and misses in the flow table, an entry will automatically be generated for that flow and the packet will be forwarded to a firewall service instead of being delivered to the destination virtual machine. When the firewall service node responds with a permit or deny action, the flow table entry is updated and future packets in that flow are thereafter delivered directly to the destination virtual machine (permit) or dropped (deny). Depending on the packet type and programmed miss action, the new flow packet can be encapsulated in a service header and forwarded to the appropriate services node, which may reside locally as a virtual service or remotely as a service node, where the service node may be a firewall, a load balancer, an intrusion detection service, or other network based service.

Similarly, a flow hit may have an associated action which might include packet rewrite, encapsulation, and/or forwarding action. Thus, for example, a packet that hits a flow table entry can be dropped in the case of a firewall deny action, rebuffered to a local queueing system to enforce quality of service policies such as high to low priority, rate limiting, or committed infolination rate policy, delivered to the destination virtual machine using a high priority interrupt for low latency policy, or simply counted and time stamped in the flow table in support of netflow statistics.

When a look up in a flow table results in no match and all available table entries are occupied by other flows, a collision is said to occur. In the event of a collision, various actions can be take place. For example, packets may be placed in a designated queue for software collision handling, or collision packets may be forwarded to attached services without the help of flow table offload mechanism. In addition, autonomous management agent 250 may be configured to perform certain functions upon a collision result. For instance, autonomous management agent 250 may be configured to insert the flow in local memory or build a software collision table in its local memory (e.g., memory 202).

As shown in FIG. 2, multiple flow tables 230a, 230b, 230c are supported and can be used according to packet classification results and/or virtual interface identifiers. Different flow tables are created for, e.g., TCP, UDP, FTP, and other L2 protocols as each of these protocols presents different header fields to be extracted from the packet in order to uniquely identify flows within the protocol. Flow table entries can keep flow statistics including packet and byte counts as well as timestamps, which the autonomous management agent 250 may use to support a network flow collection point, for example. In one example implementation, the autonomous management agent 250 comprises three embedded central processing units (CPUs) 201 with a memory system 202 and a number of hardware input/output 10 devices (not shown).

Not only can autonomous management agent 250 be configured to operate as already indicated, but autonomous management agent 250 may also be configured to be the interface with which central management tool 180 communicates. For instance, flow table policies and handling instructions can be "uploaded" from central management tool 180 to NIC 200 via autonomous management agent 250. Agent 250 may also be configured to handle special case packets and flow events. For example, packets that contain management commands to control the assignment of network services to LIFs are handled directly by Agent 250, or packets which do not match any flow table profile can be delivered to Agent 250 for software handling or logging. Agent 250 may still also be configured to perform packet encapsulation and forwarding. For example, complex and evolving encapsulation or tunneling protocols cannot always be handled by hardware table mechanisms but can be diverted to Agent 250 for lower speed handling while the hardware mechanisms continue to handle known encapsulations.

Figure 3:
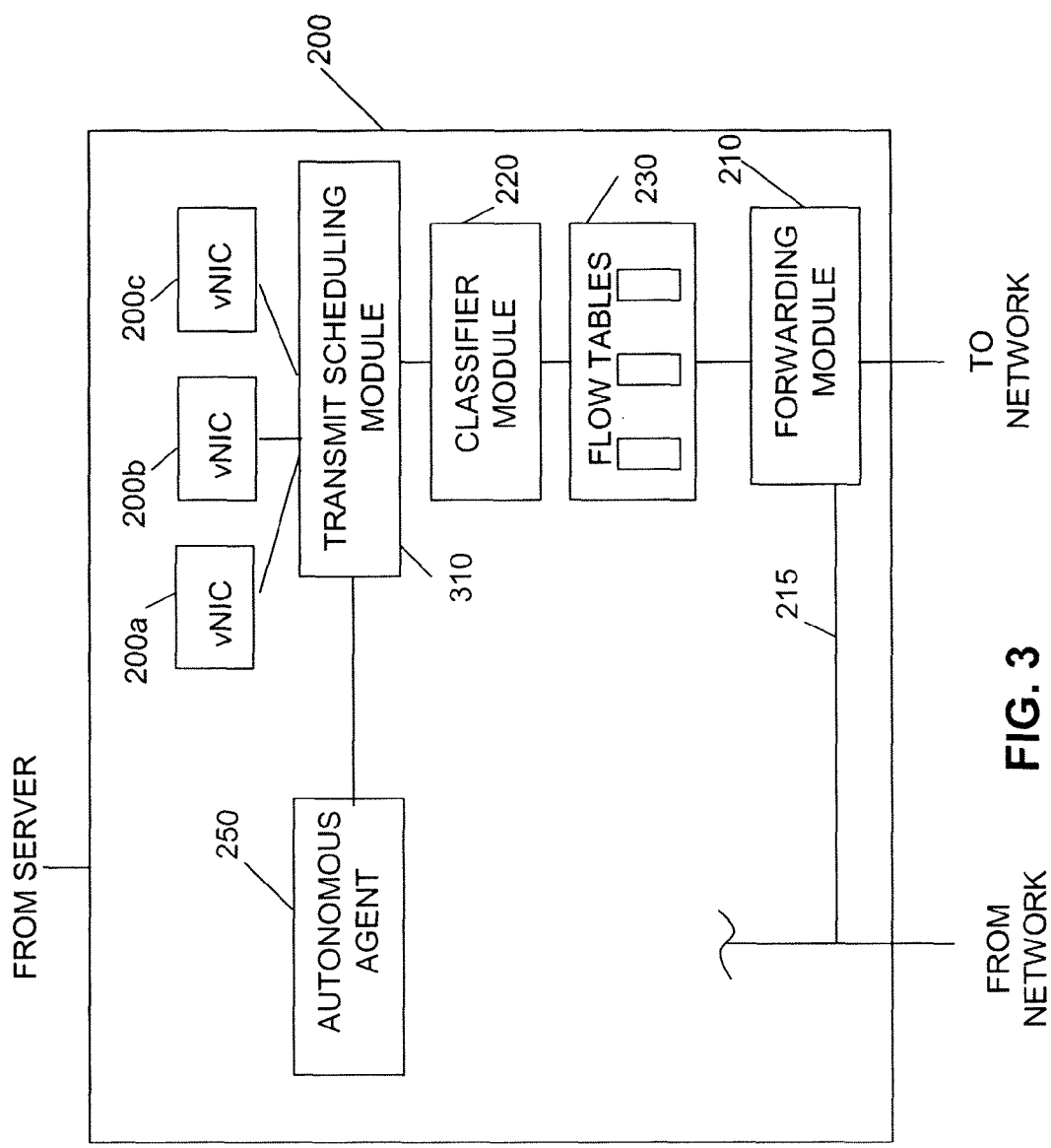

FIG. 3 shows how packets being sent from server 110 (e.g., a VM running on server 110) are processed by NIC 200 for egress to the network. The appropriate virtual NIC 200a, 200b, 200c will effectively receive the packet (acting as a "dedicated" network interface controller for the VM from which the packet was sent) and pass the packet to transmit scheduling module 310. Transmit scheduling module 310 is configured to assign each vNIC with a scheduling priority and bandwidth allocation. As is seen in FIG. 3, autonomous management agent 250 is in communication with transmit scheduling module 310 in order to set the scheduling policy of each vNIC 200a, 200b, 200c, according to packets received from the network with management commands.

After being processed by transmit scheduling module 310, a given packet is passed to classifier module 220 where a packet type is identified based on LIF and a match in memory. A flow table can then be assigned based on the packet type. With the packet type so-identified, the packet is passed to the appropriate flow table 230a, 230b, 230c in flow table module 230. Once again, the packet is looked up, and it is determined whether a hit, miss, or collision has occurred. Appropriate processing can then be performed. For example, a flow table hit means the flow is established and can be forwarded according to the control bits in the flow table entry, while a miss indicates the flow is new and may need to be sent to a firewall service for inspection before being allowed transmission to the network.

Based on the policy applied in the selected flow table, the packet may be sent by forwarding module 210 back out to the network, or be sent for loopback via path 215.

The embodiments described herein allow flows to be tracked down to the virtual machine and virtual device level, support a completely distributed flow tracking and management model, and scale from a flow count and performance level with the number and type of computers in a data center.

One potential advantage of the embodiments described herein is that to the extent hypervisor 115 is configured to perform flow tacking, etc., a substantial burden can be removed from the hypervisor and host processor (i.e., processor(s) running on server 110). In addition, by configuring NIC 200 in the manner described herein, flow tracking and services applications can occur even in the absence of a hypervisor.

Those skilled in the art will appreciate that the foregoing describes how a network interface controller can be tightly integrated with virtual interface support, packet classification, flow tables, forwarding mechanisms, and an autonomous management agent to provide secure and scalable network services to data centers.

It is noted that NIC 200 may be the most scalable point at which to track flows, as it is associated with a single physical machine where the number of network connections scales with the host processor and network interface controller technology.

Further, identifying flows and tracking flows at the computer edge provides, perhaps, the most accurate view of virtual machine connections as the NIC 200 is aware of which virtual operating system and/or application is associated with which virtual interface device. For example, because a virtual NIC or virtual function at a Peripheral Component Interconnect Express (PCIe) bus can be associated with its virtual machine flows, there may be reduced uncertainty or spoofing of the connection terminus. Virtual machine move events are also tracked with their flows.

Further still, managing flows at NIC 200 can be performed without involvement or knowledge of the computer operating system, virtual or physical. Flow management and policies can be applied by central management tool 180 via secure connections to the network interface controller's autonomous management agent 250.

It is also noted that distributed flow tracking allows distributed services steering. Flows that are identified for service applications can be delivered to a local virtual service or forwarded to a remote service node after application of a service header. No central flow distributor or service node is required.

Finally, NIC 200 can track flows and apply network services with no dependencies on the host configuration or operating system. Management can be applied via a network based management system and the host software need not be trusted to enforce flow based policies.

Figure 4:
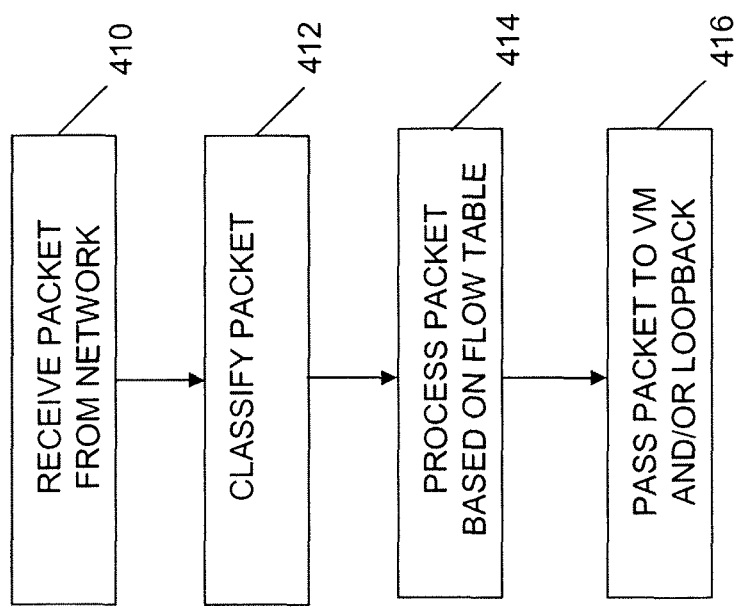
FIG. 4 depicts an example series of steps for treating a packet that is part of a packet flow that is passing, via a network interface card comprising a plurality of virtual network controllers, from a network to a virtual machine running on a server.

FIG. 4 depicts an example series of steps for treating a packet that is part of a packet flow that is passing from a network to a virtual machine running on a server via a network interface card comprising a plurality of virtual network controllers. With reference also to FIG. 2, at step 410, a packet is received at NIC 200. At step 412 the packet is classified to determine what flow type the packet is part of. Using the flow type information, the packet is processed at step 414 based on the flow table associated with the indicated flow. At step 416, the packet is passed out of NIC 200 towards a virtual machine running on a computer to which NIC 200 is communicatively coupled, and/or looped back, internal to NIC 200, for additional processing.

Figure 5:
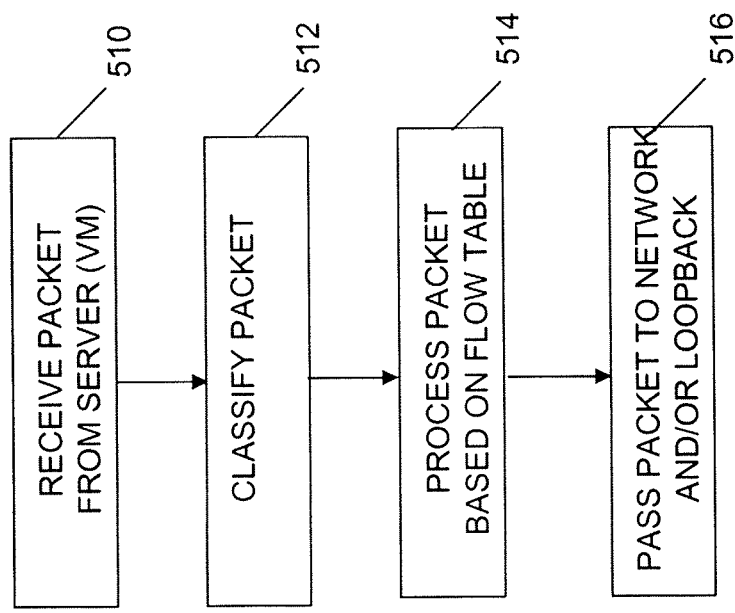
FIG. 5 depicts an example series of steps for treating a packet that is part of a packet flow that is passing, via a network interface card comprising a plurality of virtual network controllers, from a virtual machine running on a server to the network.

FIG. 5 depicts an example series of steps for treating a packet that is part of a packet flow that is passing from a virtual machine running on a server to the network, via a network interface card comprising a plurality of virtual network controllers. With reference also to FIG. 3, at step 510 a packet is received from a computer or server that is running, e.g., a virtual machine. At step 512 the packet is classified to determine its type. Based on its type, a flow with which the packet is associated can be determined. The packet is then, at step 514, processed based on the flow table associated with the indicated flow type. The processed packet is then, at step 516 passed to the network and/or looped back for further processing within NIC 200.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
    receiving a packet at a network interface card from a data communication network;
    classifying, within the network interface card, the packet to select one of multiple flow tables to which the packet should be assigned to obtain a selected flow table, the classifying being based, at least, on a logical interface with which the packet is associated;
    processing the packet based on information stored in the selected flow table; and
    passing the packet to one of a plurality of virtual machines operating on a computer to which the network interface card is communicatively connected, the one of the virtual machines being associated with the logical interface and having within the network interface card a dedicated virtual network interface controller from among a plurality of virtual network interface controllers.

2. The method of claim 1, further comprising receiving, from the computer to which the network interface card is communicatively connected, at the network interface card, a second packet, and forwarding the second packet for classifying within the network interface card.

3. The method of claim 1, further comprising replicating, within the network interface card, the packet for multicasting.

4. The method of claim 1, further comprising, within the network interface card, at least one of rewriting at least a portion of the packet, encapsulating the packet or forwarding the packet based on information stored in the selected flow table.

5. The method of claim 1, further comprising, within the network interface card, updating the selected flow table to include aspects of the packet when the packet belongs to a new flow.

6. The method of claim 1, further comprising receiving control data from a management tool that is different from the computer to which the network interface card in connected.

7. The method of claim 6, further comprising setting management and policies for packet flows using the management tool.

8. The method of claim 1, further comprising, within the network interface card, tracking packet and byte statistics for each flow represented in the flow tables.

9. The method of claim 1, further comprising looping back, within the network interface card, a packet that has already been processed by the selected flow table.

10. A processor readable non-transitory medium encoded with instructions that, when executed by a processor, cause the processor to:
- receive a packet at a network interface card from a data communication network;
- classify, within the network interface card, the packet to select one of multiple flow tables to which the packet should be assigned to obtain a selected flow table, wherein classifying is based, at least, on a logical interface with which the packet is associated;
- process the packet based on information stored in the selected flow table; and
- pass the packet to one of a plurality of virtual machines operating on a computer to which the network interface card is communicatively connected, the one of the virtual machines being associated with the logical interface and having within the network interface card a respective dedicated virtual network interface controller from among a plurality of virtual network interface controllers.

11. The processor readable medium of claim 10, further comprising instructions that, when executed by the processor, cause the processor to:
- receive, from the computer to which the network interface card is communicatively connected, at the network interface card, a second packet, and forward the second packet for classifying within the network interface card.

12. The processor readable medium of claim 10, further comprising instructions that, when executed by the processor, cause the processor to:
- replicate, within the network interface card, the packet for multicasting.

13. The processor readable medium of claim 10, further comprising instructions that, when executed by the processor, cause the processor to:
- at least one of, in the network interface card, rewrite at least a portion of the packet, encapsulate the packet or forward the packet based on information stored in the selected flow table.

14. The processor readable medium of claim 10, further comprising instructions that, when executed by the processor, cause the processor to:
- update the selected flow table to include aspects of the packet when the packet belongs to a new flow.

15. The processor readable medium of claim 10, further comprising instructions that, when executed by the processor, cause the processor to:
- receive control data from a management tool that is different from the computer to which the network interface card in connected.

16. The processor readable medium of claim 15, further comprising instructions that, when executed by the processor, cause the processor to:
- set management and policies for packet flows based on data from the management tool.

17. An apparatus, comprising:
- a forwarding module configured to receive a packet from an electronic network and determine a logical interface with which the packet is associated;
- a classifier module configured to identify a flow with which the packet is associated based on the logical interface; and
- a plurality of flow tables, one of which is configured to be selected based on the flow with which the packet is associated, the selected flow table configured to process the packet in accordance with a predetermined policy,
- wherein the apparatus is configured to operate multiple dedicated virtual network interface controllers that are configured to serve respective virtual machines running on a server when the apparatus is communicatively coupled to the server.

18. The apparatus of claim 17, further comprising an autonomous management agent module that is configured to at least one of rewrite at least a portion of the packet, encapsulate the packet or forward the packet based on information stored in the flow table.

19. The apparatus of claim 17, wherein the autonomous management agent module is configured to receive control information from a management tool that is different from the server.

20. The apparatus of claim 17, further comprising a loopback path between the flow tables and the forwarding module.

* * * * *